United States Patent
Mariana

(10) Patent No.: US 7,185,064 B1
(45) Date of Patent: Feb. 27, 2007

(54) METHOD AND ARCHITECTURE FOR REMOTE CONTROL OF A USER STATION VIA AN INTERNET-TYPE NETWORK AND APPLICATION THEREOF TO A SMART CARD DEMONSTRATOR

(75) Inventor: Renaud Mariana, Le Chesnay (FR)

(73) Assignee: CP8 Technologies, Paris (FR)

( * ) Notice: Subject to any disclaimer, the term of this patent is extended or adjusted under 35 U.S.C. 154(b) by 790 days.

(21) Appl. No.: 09/856,700

(22) PCT Filed: Sep. 25, 2000

(86) PCT No.: PCT/FR00/02642

§ 371 (c)(1),
(2), (4) Date: May 25, 2001

(87) PCT Pub. No.: WO01/24475

PCT Pub. Date: Apr. 5, 2001

(30) Foreign Application Priority Data

Sep. 27, 1999 (FR) .................................. 99 12011

(51) Int. Cl.
G06F 15/16 (2006.01)
G06F 15/173 (2006.01)

(52) U.S. Cl. ..................... 709/217; 709/219; 709/223; 709/229

(58) Field of Classification Search ................ 709/212, 709/213, 216, 219, 224, 225, 238
See application file for complete search history.

(56) References Cited

U.S. PATENT DOCUMENTS 5,898,838 A    4/1999  Wagner
5,987,612 A *  11/1999 Takagawa et al. ........... 713/201
5,995,965 A *  11/1999 Experton ...................... 707/10
6,105,008 A *  8/2000  Davis et al. .................. 705/41
6,745,247 B1 * 6/2004  Kawan et al. ............... 709/245

FOREIGN PATENT DOCUMENTS

| DE | 198 02 684 A | 12/1998 |
| WO | WO 98 57474 A | 12/1998 |
| WO | WO 99 14678 | 3/1999 |
| WO | WO 99 14678 A | 3/1999 |

* cited by examiner

Primary Examiner—Abdullahi Salad
Assistant Examiner—Hussein El-chanti
(74) Attorney, Agent, or Firm—Miles & Stockbridge P.C.; Edward J. Kondracki

(57) ABSTRACT

The invention concerns a method and an architecture using a smart card (2) for remote control, via an internet-type network (RI), of a user station (1) comprising a smart card reader (3). The data required to control the station (1) are stored (41) in a remote server (4). The station (1) comprises a web-type browser (10) that transmits requests to the server (4). In response, the latter generates specific commands designed for the smart card (2). The station (1) comprises a specialized software module (8) forming an interface between the smart card reader (3) and the internet network (RI). This module (8) translates the specific commands into commands in conformity with the ISO 7816-4 standard, and transmits them to the smart card (2) in order to activate an application of the latter. The server (4) can also store (42) HTML pages. The smart card (2) transmits, via the specialized software module (8), a response to the remote server (4), which processes it and retransmits the data to the browser (10) for display on a screen (5). The invention is particularly applicable to a smart card (2) demonstrator.

18 Claims, 2 Drawing Sheets

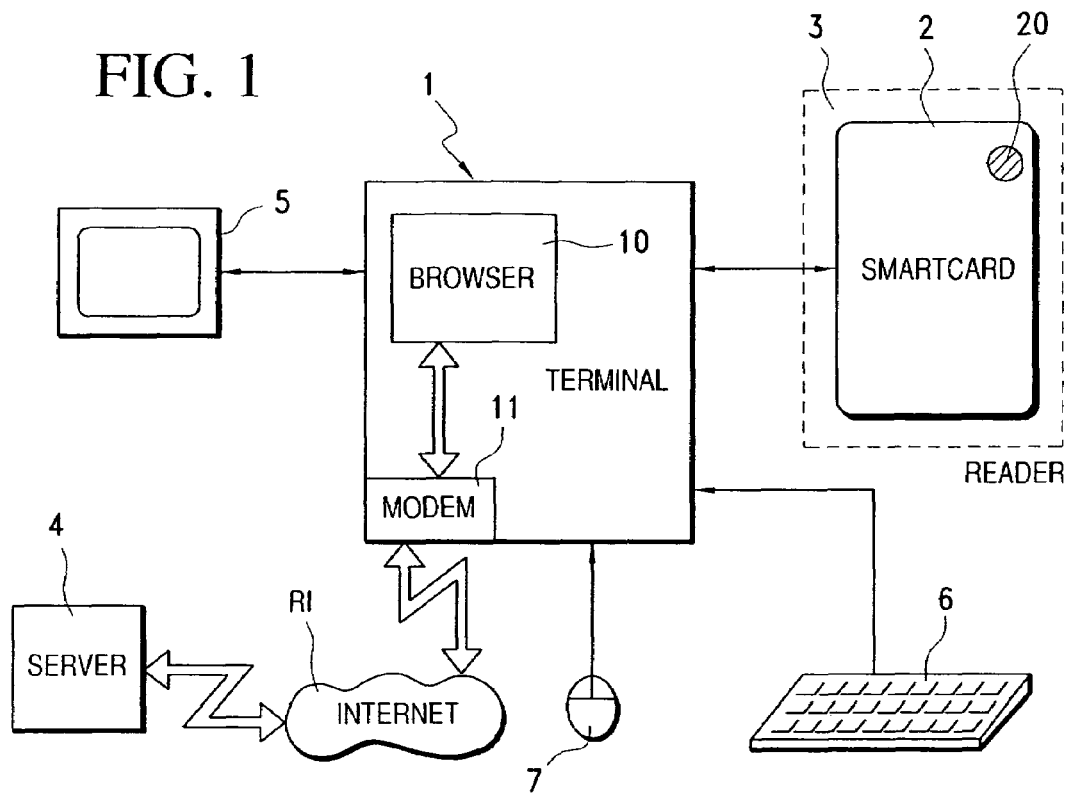
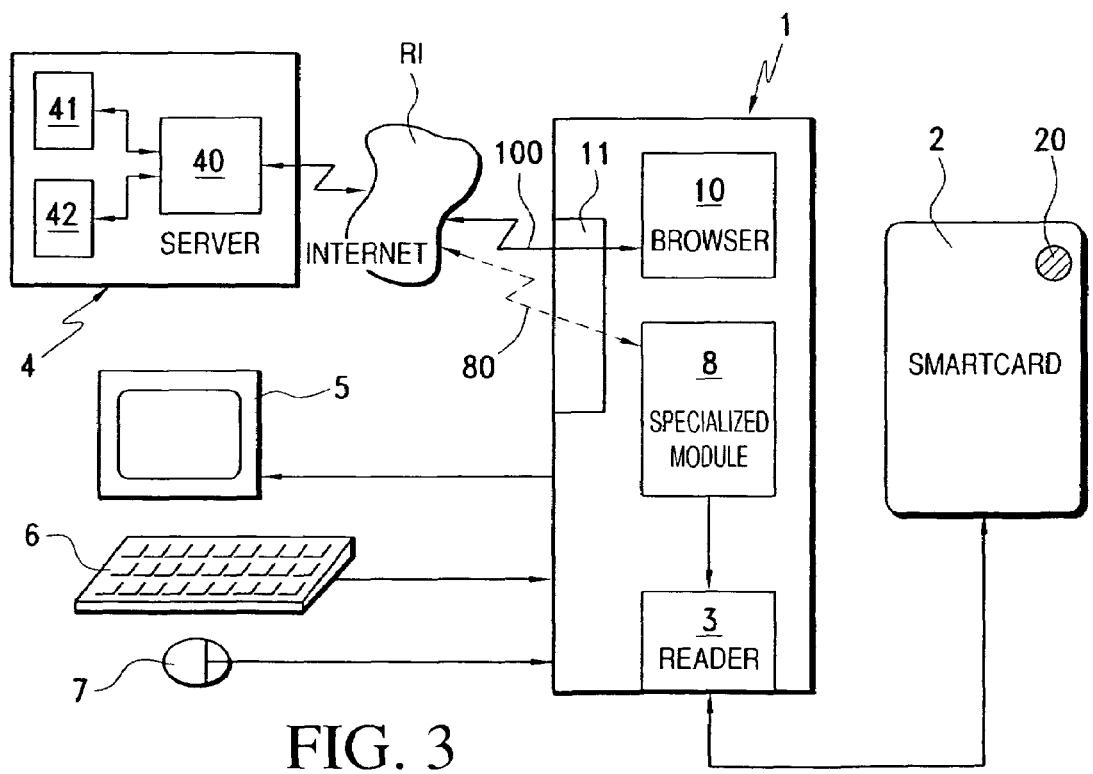

METHOD AND ARCHITECTURE FOR REMOTE CONTROL OF A USER STATION VIA AN INTERNET-TYPE NETWORK AND APPLICATION THEREOF TO A SMART CARD DEMONSTRATOR

FIELD OF THE INVENTION

The invention relates to a method for remote control of a user station equipped with a smart card reader via an internet type network.

The invention also concerns an architecture for implementing such a method.

The invention is particularly applicable to a smart card demonstrator.

In the field of the invention, the term "user station" should be understood in a general sense. The aforementioned station can particularly be constituted by a personal computer running on various operating systems such as WINDOWS or UNIX (both of which are registered trademarks). It can also be constituted by a workstation, a portable computer or a so-called card terminal, said to be dedicated. Hereinafter, a user station of this type will simply be called a "terminal."

Likewise, in the field of the invention, the term "internet network" includes, in addition to the Internet per se, private enterprise or similar networks called "intranets" and the networks that extend them to the outside, called "extranets."

DESCRIPTION OF RELATED ART

Smart cards are used in various fields: banking and health care applications, as so-called electronic purses, etc. Moreover, several applications can coexist in a smart card (multi-application card).

When a new application is made available in a smart card, it is desirable to be able to use terminals, whether dedicated or not, to organize training sessions, particularly for presenting the functionalities of this card and its capabilities. These training or presentation sessions can be aimed at various audiences: maintenance personnel, vendors, or even end users. The educational content and the form of the presentations to be provided should generally be adapted to the intended audience.

In the prior art, the solutions traditionally proposed for creating a smart card demonstration station, which hereinafter will simply be called a "demonstrator," use a personal computer-based configuration and specific programs to control the terminal and its smart card reader. These programs are most often written in a language of the Basic, C++ or Java (registered trademarks) type.

This solution, while it generally does not require equipment that is particularly expensive (a simple personal computer), is not necessarily free of drawbacks, including the following:

the aforementioned specific programs are most often voluminous;

their installation is also lengthy and complex;

it is necessary to save the newly installed programs in the machine and, during the first installation, if the machine does not have a program that allows them to be saved on a specialized peripheral, of the IOMEGA (registered trademark) type or the like, it is also necessary to install such a program;

for each update of the application stored in the smart card, or when the content of the demonstration is different (adapted to the audience in question, for example), it is necessary to reiterate the processes mentioned above; and for the operators, learning the operating mode of a piece of software written in the languages mentioned above takes time, since their graphical interfaces are not standardized; the operators must therefore be specialized, which can entail additional costs.

It must be added that if several terminals are used for demonstration purposes, the aforementioned drawbacks are repeated for each of these terminals; in particular, it is necessary to load the same program x times, if x is the number of terminals, and the latter can be quite remote from one another. Even if procedures for downloading from a central server are used, it is still necessary to make sure that the version of the software present in all the terminals is identical. Specific administrative procedures are therefore required.

Furthermore, with the development of the internet network, it is desirable to be able to control the presentation terminals remotely, via this precise network, using standard transmission protocols used in the latter.

Some solutions of this type have been proposed. However, these solutions are not free of drawbacks, either. They essentially make it necessary to download or install in the terminal, for each demonstration application, a specific piece of software known as a "plug-in," generally written C language or C++, so that the terminal can communicate with the smart card via a smart card reader. The aforementioned pieces of software suffer from the same problems as those mentioned above: voluminous code that must be installed or downloaded prior to each demonstration, non-standardized graphical interfaces, etc. As before, it is essentially impossible to install a plug-in once and for all, since the latter specifically depends not only on the type of browser used, but on the application being demonstrated and the versions of the control programs.

SUMMARY OF THE INVENTION

The invention seeks to eliminate the drawbacks of the methods and devices of the prior art, some of which have just been mentioned, while meeting the needs that have arisen.

The object of the invention is to provide a method and a system architecture for controlling a terminal equipped with a smart card reader and connected in a conventional way to an internet-type network, particularly in order to perform demonstrations of at least one application stored in the smart card.

To this end, according to an essential characteristic of the invention, the control software specific to each of the demonstration applications is hosted by a remote web-type server connected, also in a conventional way, to the internet network. The terminal itself is equipped with a particular piece of software that will hereinafter be called "specialized." Within the context of the invention, the term "specialized" used for this piece of software indicates merely that it is a non-standard piece of software that must be installed in the terminal, but not in any case that it is specific to the application being demonstrated. On the contrary, this piece of software, from the point of view of an application, is entirely generic and is independent from the latter, no matter what it is.

Moreover, according to another important characteristic, the size of the piece of software required can be very small, for reasons linked to the nature of the functions devolved to it, which will be explained below. Because of this, it can be installed once and for all in the terminal and reside there permanently, without significantly altering the computing resources specific to the terminal, including its memory capacity, particularly if the latter is used for other tasks.

The invention therefore offers many advantages, including the following:

simplified updating of the demonstrations, since only the programs hosted by the remote server need be modified; specific intervention in the terminals is no longer necessary;

a fast and simple configuration of the terminal, which can be a standard type of microcomputer equipped with a browser, which can also be of a common type on the market, often pre-installed, for the same reasons as mentioned above (the data specific to the demonstration itself being located in the server);

the graphical interface is also standardized, since it is provided by the browser, whose characteristics and operating mode are familiar to the operator of the terminal, even if the latter does not have any particular programming or computer expertise; and the added cost and the increase in complexity due to the specific provisions of the invention are negligible, since they are reduced to just one installation of a piece of specialized software of small size, an installation which can moreover, under certain circumstances, be performed once and for all.

It follows that the present system offers great universality, since the terminal can virtually perform all of an enterprise's or a company's demonstrations, no matter what the smart card to be presented, the only condition being that the latter be of a standardized type so as to be compatible with the terminal, which itself is outside the strict scope of the invention. The system also provides great reliability.

The main subject of the invention is a method for remote control of a user station via an internet-type network, said user station being equipped with a smart card reader and comprising a first communication protocol stack, said smart card reader comprising a second communication protocol stack and said smart card comprising a third communication protocol stack, allowing communications between said user station and a remote server connected to said network and communications between said user station and said smart card via said smart card reader, said user station also comprising means for generating requests transmitted to said remote server, characterized in that it comprises:

a first preliminary phase for storing in said remote server data and/or instructions allowing the generation of specific commands upon reception of specific requests originating from said request generating means and their transmission to said user station;

a second preliminary phase for loading into said user station a piece of specialized software forming an interface between said first and second protocol stacks, and designed to translate said specific commands received by said user station into commands that conform to a first given communication protocol;

and at least the following steps:

a/ the transmission to said remote server of at least one specific request;

b/ the generation by said remote server, upon reception of such a request, of at least one of said specific commands and their transmission to said user station using a second given communication protocol;

c/ the reception of said specific command in said user station, its interception by said piece of specialized software, and its translation into said first given communication protocol;

d/ the transmission of said translated command to said smart card using said first given communication protocol, via said smart card reader; and e/ the activation by said translated command of at least one given function of at least one application stored in said smart card, in order to perform said control.

Another subject of the invention is a system architecture for implementing this method.

More particularly, the invention applies to the application of the method and the system architecture to a smart card demonstrator.

BRIEF DESCRIPTION OF THE DRAWINGS

The invention will now be described in greater detail by referring to the attached drawings, in which:

FIG. 1 schematically illustrates an exemplary smart card-based application system architecture according to the prior art;

FIG. 3 illustrates an exemplary architecture for the remote control of a smart-card based application system according to the invention.

DESCRIPTION OF THE PREFERRED EMBODIMENTS

Figure 2:
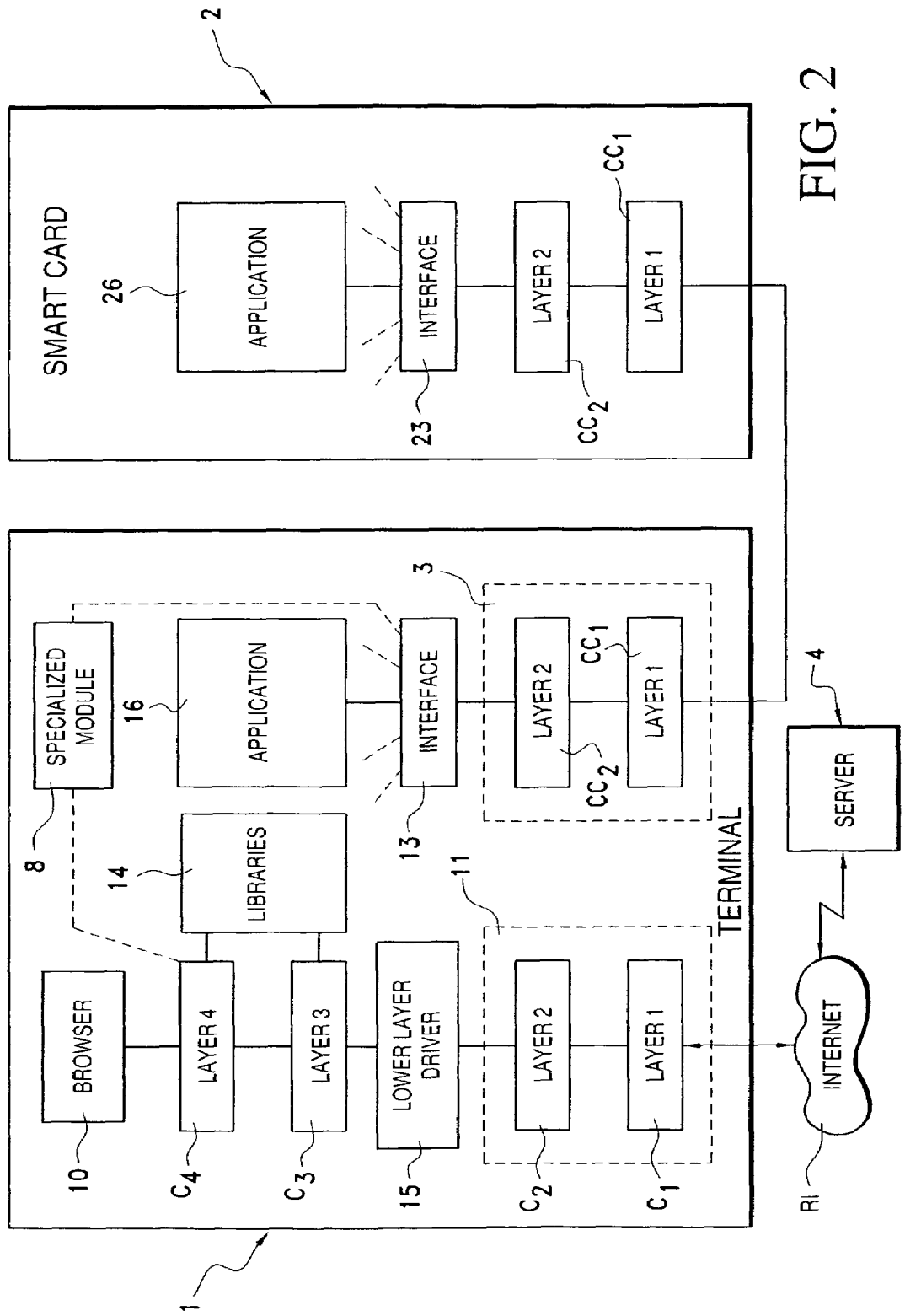
FIG. 2 illustrates in greater detail the logical architecture of such a system.

Hereinafter, without in any way limiting its scope, we will concentrate on the preferred application of the invention unless otherwise indicated, i.e., its application to a smart card demonstrator.

First of all, let us briefly review the essential technical characteristics of a smart card-based application system. It generally includes the following main elements:

a smart card;

a host system constituting the aforementioned terminal;

a communication network i.e. the internet network in the preferred application;

and an application server connected to the internet network.

FIG. 1 schematically illustrates an exemplary architecture of this type. The terminal 1, for example a personal computer, includes a smart card 2 reader 3. This reader 3 may or may not be physically integrated into the terminal 1. The smart card 2 comprises an integrated circuit 20 whose input-output connections appear on the surface of its substrate so as to allow a supply of electric power and communications with the terminal 1. The latter comprises circuits 11 for access to the internet network. This may involve a modem for connecting to a switched telephone line or an integrated services digital network (ISDN), for example via an Internet service provider (or ISP).

The terminal 1 naturally comprises all the circuits and elements required for its operation, which are not represented in order to keep the drawing simple: central processor, random access and read-only memories, magnetic disk mass storage, diskette and/or CD-ROM drive, etc.

Normally, the terminal 1 is also connected to standard peripherals, which may or may not be integrated, such as a display screen 5, a keyboard 6 and a pointer 7, for example a mouse.

In the field of the invention, it is specifically due to the cooperation of these terminals that the demonstration can be performed.

The terminal 1 can be placed in communication with servers connected to the network RI, one of which 4 is illustrated in FIG. 1. The access circuits 11 place the terminal 1 in communication with the servers 4 using a particular piece of software 10 called a browser. The latter makes it possible to access various applications distributed throughout the network RI, generally in a client-server mode.

Normally, communications in networks take place in accordance with protocols that conform to standards comprising several superposed software layers. In the case of an internet-type network RI, communications take place using protocols that are specific to this type of communication, but that also comprise several software layers. The communication protocol is chosen based on the application specifically intended: web page queries, file transfers, email, forums or news, etc.

The architecture of communication networks is described by various layers. For example, the OSI (Open Systems Interconnection) standard defined by the ISO comprises seven layers, which go from the so-called lower layers (for example the so-called physical layer that supports the physical transmission) to the so-called upper layers (for example the so-called application layer), passing through intermediate layers, including the so-called transport layer. A given layer offers services to the layer immediately above it and requires other services from the layer immediately below it, via appropriate interfaces. The layers communicate by means of primitives. They can also communicate with layers of the same level. In certain architectures, one or more of these layers may be nonexistent.

In an internet environment, there are five layers, more precisely, going from the top layer to the bottom layer, the applications layer (http, ftp, email, etc.), the transport layer (TCP), the network address layer (IP), the data link layer (PPP, Slip, etc.) and the physical layer.

We will now describe in greater detail a typical example of an architecture for a smart-card based application system according to the prior art, with reference to FIG. 2. More specifically, this figure describes the layered logical architecture.

The terminal 1 comprises the circuits 11 for access to the network RI, which contain the lower software layers $C_1$ and $C_2$ corresponding to the aforementioned physical and data link layers.

Also represented are the upper layers $C_3$ and $C_4$ corresponding to the network address (IP) and transport (TCP) layers. The uppermost application layer (http, ftp, email, etc.) is represented by a web browser 10 of any type, preferably a standard type sold on the market.

The interface between the lower layers $C_1$ and $C_2$ and the upper layers $C_3$ and $C_4$ is constituted by a software layer 15 generally called a lower layer driver. The upper layers $C_3$ and $C_4$ are supported by this interface and are implemented by means of libraries of specific functions or network libraries 14, with which they correspond. In the case of the Internet, TCP/IP is implemented by means of libraries called "sockets."

This organization allows the browser 10 to present requests 10 to a remote server 4, in order to consult web pages (HTTP protocol), transfer files (FTP protocol) or send email (email protocol).

The terminal 1 also comprises the smart card reader 3, which may or may not be integrated. In order to communicate with the smart card 2, the card reader also contains the two lower layers $CC_1$ (physical layer) and $CC_2$ (data link layer), which play a role similar to the layers $C_1$ and $C_2$. The software interfaces with the layers $CC_1$ and $CC_2$ are described, for example, by the PC/SC specification ("part 6, service provider"). The layers $CC_1$ and $CC_2$ themselves are described by the ISO 7816-1 and 7816-4 standards.

An additional software layer 13 forms an interface between the application layers, indicated by the same reference 16, and the lower layers $CC_1$ and $CC_2$. The main function devolved to this layer 13 is a multiplexing/demultiplexing function.

The architecture of the terminal 1 described up to this point is entirely common in the prior art. FIG. 2 also represents, in broken lines, an additional element 8, which will be called a specialized module and is specific to the invention. This module 8 is disposed between the layer $C_4$ and the interface 13. The function of this module will be explained below.

On the smart-card 2 end, the organization is similar to that of the terminal 1, including the presence of two lower layers, referenced $CC'_1$ (physical layer) and $CC'_2$ (data link layer), as well as an interface layer 23, entirely similar to the layer 13. This layer 23 provides an interface between the aforementioned protocol layers $CC'_1$ and $CC'_2$ and one or more application layers, represented in the form of a single module referenced 26.

Communications between the terminal 1 and the smart card 2 take place by means of standardized commands.

Various protocols may be used, including the following non-exhaustive examples:

the ETSI GSM 11.11 recommendation;

the protocol defined by the ISO 7816-3 standard, in character mode T=0;

the protocol defined by the ISO 7816-3 standard, in block mode T=1;

or the protocol defined by the ISO 3309 standard, in HDLC (for High-Level Data Link Control procedure) frame mode.

Within the scope of the invention, the ISO 7816-3 protocol is preferably used, in block mode.

In an intrinsically known way, each protocol layer is associated with a certain number of primitives that allow data exchanges between layers of the same level and from one layer to another.

In the current state of the art, it is not possible to place the smart card in direct communication with a remote server 4 via the internet network RI. Also, as noted, in order to perform a demonstration of one or more applications stored in the smart card 2, it has been proposed in the prior art to either implement specific pieces of software in the terminal 1, or download them from a remote server in the form of plug-ins. These solutions have many drawbacks, which have already been mentioned.

We will now describe a system architecture according to the invention that makes it possible to eliminate these drawbacks, with reference to FIG. 3.

With the exception of the specific provisions of the invention, the architecture presented in FIG. 3 maintains the essential hardware and software configuration of FIGS. 1 and 2. Also, only the elements that are indispensable to a proper understanding of the invention are represented. Moreover, the common elements of these figures have the same references and will only be re-described as necessary.

It should also be clearly understood that the smart card 2 does not require any adaptation. The communications between the terminal 1 and the latter take place, as in the prior art, using the sets of standardized commands that have been succinctly described.

Also, in order to keep the drawing simple, the various communication protocol layers, intrinsically common in the prior art, are not represented.

According to a first important characteristic of the invention, the essential information and codes required to perform a demonstration of a particular smart card, and more generally, to control such a smart card, are located not only in the terminal 1, in whatever form, (program or specific plug-ins downloaded), but in the remote server 4.

According to a second important characteristic of the invention, a specialized module 8 is provided in the terminal 1. However, it should be clearly understood that the term "specialized" has a specific meaning within the scope of the invention. The module 8 is disposed between the layer $C_4$ of the protocol stack of the terminal 1 and the interface 13 (see FIG. 2), as indicated above. It is advantageously constituted by a piece of software and its essential functions are to provide an interface between the internet network RI and the smart card reader 3, and to translate commands received from the server 4 via the internet network RI into standardized commands that conform to the aforementioned ISO standards. In this sense, the module 8 is "generic" in nature since it is completely independent from the application or applications stored in the smart card 2. Moreover, given the functions devolved to it, the quantity of code required is very small in practice.

In a more detailed way, the remote server 4 also comprises, for example, conventional computer data processing means (not represented), an HTTP server 40 per se, and storage devices 41 and 42, which have arbitrarily been represented separately.

A first storage device 41 makes it possible to store display pages that will be referred to as "static," for example in HTML or another format (XML, etc.).

The second storage device, referenced 42, is more particularly designed to storing data representing the contexts of the smart card or cards that are subject to a demonstration. A "smart card context" is a representation in memory of the smart card 2 at the remote server level 4. The smart card context comprises, for example, the version number of the operating system controlling the smart card. The storage device 42 also makes it possible to store data or instructions that make it possible to generate a set of specific commands required for the aforementioned smart card 2 demonstrations. These specific commands will be intercepted by the specialized module 8 and translated so that they can be understood by the smart card 2 when they are transmitted to it.

The main steps of the method according to the invention are described below.

In an intrinsically conventional way, the terminal specifically makes it possible to power up the smart card, via the smart card reader 3, and more generally, to initialize it. More precisely, it is the specialized module 8 that powers up the smart card 2, by means of a script executed in the remote server 4. The web browser 10 makes it possible, in an equally conventional way, to present requests to the remote server 4, via a modem 11 or a similar device, a conventional transmission channel 100 (a telephone line or another type) and the internet network RI. The transmission path normally passes through a service provider, possibly a firewall and/or a so-called proxy system (not represented). For example, the request presented makes it possible to display the home page of a web site on the screen 5, and then to navigate this site through successively displayed pages based on the options presented.

The request transmitted to the remote server 4 can also make it possible to display pages in HTML language related to the smart card 2, pages associated with the current demonstration and stored in the storage device 41.

In a way that is more specific to the invention, the request transmitted to the remote server 4 results in the generation by the latter of a set of specific commands designed to control the smart card 2 during the demonstration.

In essence, certain specific requests are recognized as such by the server 40 and are processed as part of the context of the smart card stored in the device 42. It must be noted that the context of the smart card 2 is updated, for example during the powering up of the smart card 2, by using the so-called RESET signal of the latter.

In an intrinsically conventional way, the generation of the commands generated by the server 40 can result from the execution of a CGI (Common Gate Interface) type script. This is a process that is well known to one skilled in the art in the field of client-server communications through the Internet. For example, when a formulary type of request is transmitted to a web server, it is transmitted via a gateway to a directory normally called "cgi-bin" in which scripts are stored. The data resulting from the execution of a particular script are retransmitted through the reverse path and sent to the client that transmitted the request, in this case in the form of specific commands transmitted to the terminal 1.

However, as noted, the smart card 2 cannot communicate directly with the internet network RI and, in particular, can neither receive, nor a fortiori interpret the commands transmitted by the server 40. These commands are normally transmitted in packets, the destination IP address being that of the terminal 1, i.e. the client. Likewise, unless a specialized plug-in is installed in the browser 10, the latter cannot communicate directly with the smart card 2.

The specialized module 8 forms an interface, on a first end, with the upper protocol layers of the terminal 1, i.e. $C_4$ (see FIG. 2). The specific commands received by the terminal 1 are intercepted and "understood" by the module 8 to be intended for it. According to one of the essential characteristics of the invention, the latter translates them into a set of commands that conform to the aforementioned ISO standards. The other commands received are not processed by the module 8, and are transmitted, in conventional fashion, to the browser 10. The server 4 has a separate connection 80 with the specialized module 8. This connection can be secure and can support an encryption of the so-called SSL (Secure Socket Layer) type.

Schematically, in order to better illustrate the method specific to the invention, the communication established between the internet network and the module 8 is illustrated by a separate channel 80, represented in dotted lines. However, it should be understood that all the communications pass through the usual communication channels, and take place in conformity with standardized transmission protocols (for example TCP/IP for the specialized module 8 and HTTP for the browser 10).

The module 8 also forms an interface, on a second end, with the smart card reader 3. Hence, it transmits to the latter the commands it has received and translated. These commands are decrypted if necessary (if the link is secure) and translated. They are then understandable by the smart card 2. In essence, after translation, the commands retransmitted to the smart card 2, via the reader 3, are in the ISO 7816-4 format and are therefore compatible with the communication mode used between the smart card reader 3 and the smart card 2.

The commands thus transmitted to the smart card 2 make it possible, for example, to power up the smart card 2, and to activate the application or applications stored in the latter, for example in order to execute particular functions and/or to read specific files stored in the latter. In return, the smart card 2 transmits to the specialized module 8, via the smart card reader 3, commands and/or instructions that make it possible, in a subsequent step, to display on the screen 5 various data specific to the smart card 2 being demonstrated. However, these commands and/or instructions are first translated by the specialized module 8, transmitted to the server 4 and retransmitted to the terminal 1 and to the browser 10.

The specialized module 8 is a server of the TCP/IP type that receives TCP/IP requests originating from a script executed in the server 40. The communication with the specialized module 8 is inserted into a request between the browser 10 and the server 40. This script is responsible for executing a series of commands addressed to the specialized module 8. The latter then acts like a TCP/IP server and returns a response for each TCP/IP command received from the server 40. The aforementioned script, which can use a process of the so-called CGI (Common Gateway Interface), or Java Servlet (registered trademark) type, processes all of the TCP/IP responses from the specialized module 8. Then, it formats an HTTP type response transmitted to the browser 10. Thus, a user (not represented), for example the holder of the smart card 2, can interact with this smart card 2 by means of the browser 10, scripts associated with the server 40, the specialized module 8 and the smart card reader 3.

The browser 10 makes it possible to display the contents of the smart card 2.

It is therefore clear that the smart card 2 is actually directly controlled by a CGI type process and a card context stored in the server 4. Everything therefore takes place as though the smart card 2 were in direct communication with the latter and receiving requests from the internet network RI.

To illustrate the concepts, in order to perform the tasks that are devolved to it, the module 8 typically has a size of 50 KB. It can be loaded into the storage means (not represented) with which the terminal 1 is provided prior to the start of a demonstration, very quickly by reason of its very small size, by means of a diskette for example, or from any other recording medium. But for the same reason, it can also be left resident without any disadvantages, after an initial load, without significantly burdening the resources of the terminal, particularly its storage resources. Again by reason of its small size, it is also possible to download it from the remote server 4, or from any other web server. With the current technologies, even when using a simple switched telephone line having a fast modem (56K), downloading a program of this size requires only several tens of seconds. This method has the advantage of always having the latest available version of the specialized program constituting the module 8.

It is easy to see that it is not necessary for the operator to have any particular programming expertise. The graphical interface, which is that of the web browser 10, which can advantageously be a well-known type sold on the market, is entirely familiar to him. He need only know the Internet address of the web site to which he must connect, an address which can be pre-stored in the browser 10, in a list of so-called "favorites" or similarly named elements, generally known as "bookmarks."

Since the server 4 can store, as indicated, so-called static pages in HTML language, the various steps of the demonstration to be performed can be displayed in the form of a menu constituted by hyperlinks, the operator selecting one of the options presented by means of the keyboard 6, or clicking on them by means of the mouse 7.

However, in order to further facilitate the running of the demonstration, and to make it more automated, it is also possible to download into the browser 10 an applet, for example in the form of a piece of software in JAVA language whose size is very small. This applet makes it possible to control the running of the demonstration by transmitting the necessary requests to the server 4, which in turn generates commands specific to the specialized module 8, then transmits the result of calculations it performs to the browser 10, in the form of an HTTP response. In this case, the essential work of the operator can be summarized as connecting to the server 4 and possibly, if necessary, in an initial phase, by loading or downloading the piece of software constituting the specialized module 8 after having powered up the terminal 1 and having inserted the smart card 2 into the reader 3.

By reading the above, it is easy to see that the invention clearly achieves the objects set forth.

The smart card does not require any adaptation. The demonstration terminal can be a microcomputer sold on the market or a similar device. It doesn't require any particular adaptation either. The only constraint specific to the invention is very limited: it is merely necessary to load, in a preliminary phase, a piece of software of small size, a piece of software that is entirely independent from the application or applications stored in the smart card during a demonstration. As indicated, this piece of software can be loaded once and for all. It can also be downloaded from the internet network. It follows that the configuration of a demonstration station is reduced to its simplest expression and does not require any particular expertise, which also contributes to making the method particularly economical.

The graphical interface is familiar to any operator, since it is the one associated with a web browser, which can advantageously be a common type.

The method allows great flexibility and great universality. In fact, the data specific to one or more demonstrations is stored in a remote server and is capable of being used by a large number of stations. The updating of a given demonstration and/or the addition of one or more demonstrations can be done very simply, since only the remote server storing the data and the programs required for these demonstrations is involved.

The method also allows an interactive mode between pages, for example of the HTML type, provided by the remote server, and information and data originating from the smart card, under the control of commands and requests originating from this same server, and transmitted, after translation, to the smart card by the piece of specialized software, via the reader.

It should be clear, however, that the invention is not limited to just the exemplary embodiments explicitly described, particularly in relation to the architecture illustrated by FIG. 3.

Finally, although the method and the architecture have been described in detail in the case of a smart card demonstrator, the invention is not in any way limited to this particular application.

The invention is applicable whenever one wishes to control a station comprising a terminal and a smart card reader, via the Internet or a similar type of network: intranet, extranet.

While this invention has been described in conjunction with specific embodiments thereof, it is evident that many alternatives, modifications and variations will be apparent to those skilled in the art. Accordingly, the preferred embodiments of the invention as set forth herein, are intended to be illustrative, not limiting. Various changes may be made without departing from the true spirit and full scope of the invention as set forth herein and defined in the claims.

The invention claimed is:

1. A method for remote control of a user station using a smart card via an internet-type network, said user station being equipped with a smart card reader and comprising a first communication protocol stack, said smart card reader comprising a second communication protocol stack and said smart card comprising a third communication protocol stack, allowing communications between said user station and a remote server connected to said network and communications between said user station and said smart card via said smart card reader, said user station also comprising means for generating requests transmitted to said remote server said method comprising:

storing in said remote server data and/or instructions in a first preliminary phase for allowing the generation of specific commands upon reception of specific requests originating from said request generating means of said user station and transmission of said specific commands to said user station;

loading into said user station in a second preliminary phase a piece of specialized software forming an interface distinct from a web browser between said first and second protocol stacks, said piece of specialized software being designed to translate said specific commands received by said user station into commands that conform to a first given communication protocol to which said smart card is responsive, said first given communication protocol being used between the smart card reader and the smart card to allow said smart card to perform operations in response to said specific commands after translation to said first given communication protocol by said piece of specialized software;

and at least the following steps:

a/ transmitting to said remote server at least one specific request;

b/ generating by said remote server, upon reception of said specific request, at least one of said specific commands and transmitting said at least one of said specific commands to said user station using a second given communication protocol;

c/ receiving said transmitted specific command in said user station, said reception step of said transmitted specific command using said piece of specialized software to intercept said specific command prior to the uppermost application layer represented by the web browser and to translate said specific command into a translated command that conforms to said first given communication protocol to which said smart card is responsive;

d/ using said piece of specialized software to transmit said translated command to said smart card, via said smart card reader; and e/ activating at least one given function of at least one application stored in said smart card, in response to said translated command in order to perform said control of the user station.

2. A method according to claim 1, wherein said data and/or instructions are stored in said remote server and allowing the generation of specific commands comprising smart card context data, said context data being a representation, in the memory of said remote server, of said smart card present in said user station.

3. A method according to claim 2, wherein said smart card is controlled by an operating system associated with a version number, and said context data comprises at least data for identifying said version number of the operating system.

4. A method according to claim 1, wherein said specific commands are the result of the execution of a CGI type script in said remote server.

5. A method according to claim 1, wherein said piece of specialized software is loaded into said user station during said first preliminary phase, from a data recording medium.

6. A method according to claim 1, wherein said piece of specialized software is downloaded into said user station during said first preliminary phase, from a remote server, via said internet network.

7. A method according to claim 1, wherein said first given communication protocol is of the TCP/IP type.

8. A method according to claim 1, wherein said second given communication protocol conforms to ISO standards 7816-1 through 7816-4.

9. A method according to claim 1, further comprising, subsequent to activating said at least one given function, the steps of:

f/ transmitting data and/or instructions between said smart card and said terminal, via said smart card reader, said transmission being performed using said first given communication protocol;

g/ translating said data and/or instructions by said piece of specialized software and transmitting the same to said remote server, using said second given communication protocol;

h/ processing said data and/or instructions by said remote server;

i/ generating by said remote server data for identifying a configuration of said smart card and/or of an application stored in said smart card, and for the transmission of said characteristic data to said terminal using a third given communication protocol; and j/ displaying said characteristic data on a display screen connected to said terminal.

10. A method according to claim 9, wherein said request generating means is constituted by a web type browser, and further comprising storing in said remote server in a third preliminary phase data constituting static display pages, and subsequent steps comprising transmitting upon reception of specific requests generated by said browser, all or some of said static display page data to said terminal in order to display pages of information associated with said smart card on said display screen.

11. A method according to claim 10, further comprising generating, by means of said browser, in a fourth preliminary phase a particular request transmitted to a remote server connected to said internet network, in order to download a particular piece of software called an applet into the browser, so as to automate all or some of said steps a/ through j/.

12. A method according to claim 11, wherein said applet is written in JAVA language.

13. A method according to claim 9, wherein said third given communication protocol is of the HTTP type.

14. A method according to claim 1, wherein said piece of specialized software forms an interface with upper protocol layers of the user station and intercepts said specific command received in user station at an upper layer C4 corresponding to a transport (TCP) layer.

15. A system architecture for remote control of a user station using a smart card via an internet-type network, said user station being equipped with a smart card reader and comprising a first communication protocol stack, said smart card reader comprising a second communication protocol stack and said smart card comprising a third communication protocol stack, allowing communications between said user station and a remote server connected to said network and communications between said user station and said smart card via said smart card reader, said user station also comprising means for generating requests transmitted to said remote server, wherein said remote server comprises a storage device for storing data and/or instructions allowing the generation of specific commands upon reception of specific requests originating from said request generating means and transmission to said user station, and in that said user station comprises a specialized module forming an interface distinct from a web browser between said first and second protocol stacks, said specialized module configured to intercept prior to the uppermost application layer represented by the web browser said specific commands and to translate said specific commands from said remote server that are received by said user station in conformity with a first given communication protocol into translated commands that conform to a second given communication protocol to which said smart card is responsive and can be transmitted using said second given communication protocol via said smart card reader to said smart card, so as to activate, in response to receiving said specific commands from said remote server, at least one given function of at least one application stored in said smart card in response to said translated commands, after translation of said specific commands received from said remote server to said second given communication protocol by said specialized module.

16. A system architecture according to claim 15, wherein said remote server further comprises an HTTP server, a first storage device for storing said data and/or instructions allowing the generation of specific commands, and a second storage device for storing data constituting display pages in HTML language.

17. A smart card demonstrator, using the system architecture according to claim 15, said user station comprising a display screen for displaying data transmitted by said remote server to said specialized module and characteristic data of a context of said smart card, using a third given communication protocol, said characteristic data being generated by said remote server upon reception of data sent by said smart card, using said second given communication protocol, translated by said specialized module and transmitted to said remote server using said first given communication protocol.

18. A system architecture according to claim 16, wherein said piece of specialized software is adapted to form an interface with upper protocol layers of the user station and intercepts said specific commands received in user station at an upper layer C4 corresponding to a transport (TCP) layer.

* * * * *